3,218,044
TOWABLE MOBILE DOSING AND MIXING PLANT WITH FORCED MIXER AND DEVICE FOR SHORTENING THE MIXING CYCLE TIME
Domenico Domenighetti, Via Nosetto 6, Bellinzona, Switzerland
Filed May 25, 1964, Ser. No. 369,811
Claims priority, application Switzerland, Aug. 7, 1963, 9,903/63
3 Claims. (Cl. 259—154)

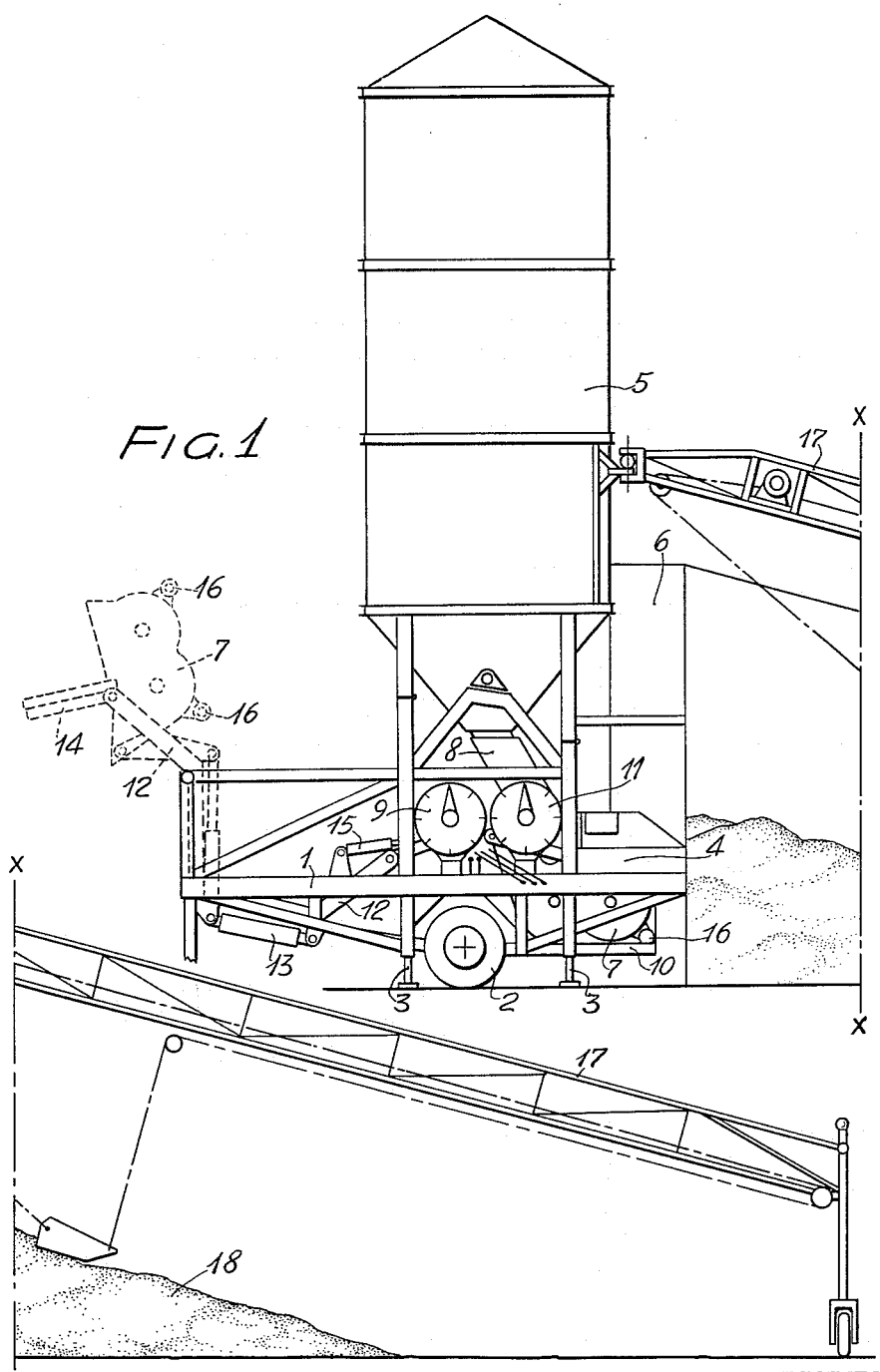

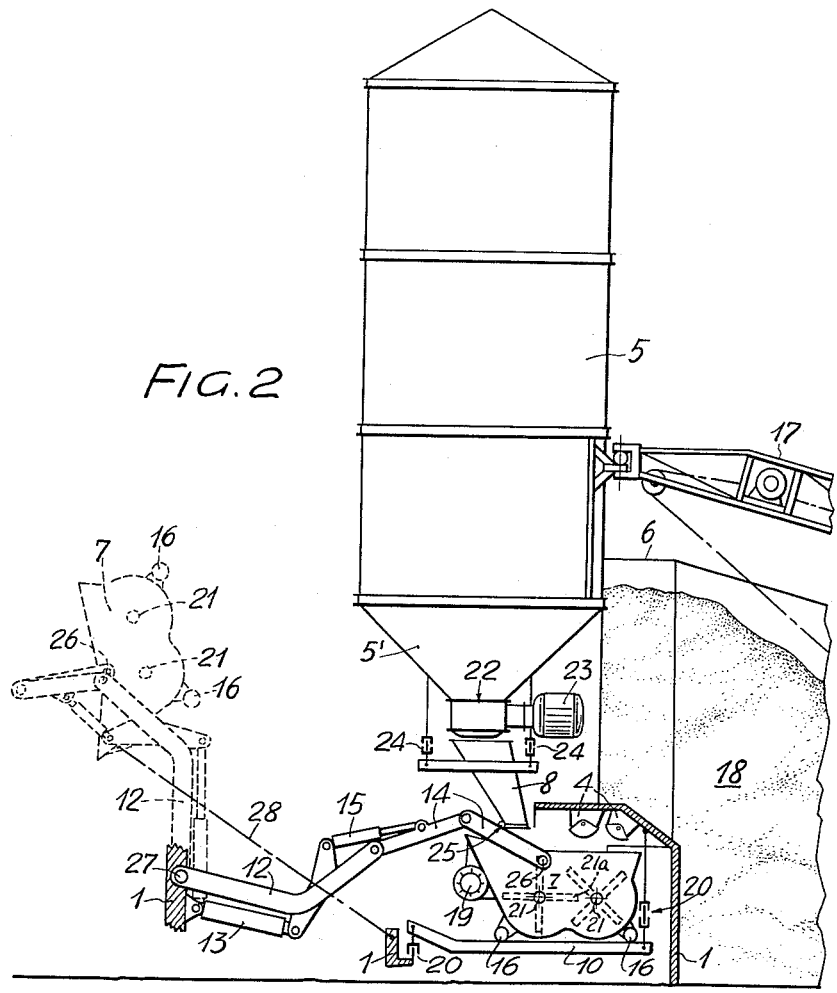

This invention relates to mobile concrete mixing plants, and more particularly to a plant for mixing weighed amounts of cement and aggregate, and for discharging the mixed concrete into a truck or the like.

A primary object of the invention is the provision of a mixing plant of the type described which performs the cycle of weighing, mixing, and discharging in a particularly short time.

An important feature of this invention is the provision of a container employed for weighing at least some ingredients of the concrete mixture and equipped with paddles mounted on shafts which remain horizontal during arcuate movement of the container from a weighing position to a discharge position.

Other objects and features of this invention will become readily apparent from the following detailed description of a preferred embodiment when considered with the accompanying drawing in which:

FIG. 1 shows the main portion of a mixing plant of the invention in side-elevation;

FIG. 2 is a fragmentary side-elevational view of the apparatus of FIG. 1, most of the supporting structure and other elements having been omitted in order better to reveal essential elements of the invention.

The working elements of the plant are supported on a carriage consisting mainly of a frame 1, wheels 2, and legs 3 that may be lowered on the frame when the plant is stationary. Several bins 6 and a large receptacle 5 are mounted on the carriage for controlled discharge of aggregate from the bins 6 through outlets 4, and for discharge of cement from the conical bottom part 5′ of the receptacle 5 into a trough 7 which is upwardly open when in the fully drawn weighing position.

Two horizontal shafts 21 are journaled in the trough 7 and are driven in opposite directions by a motor 19 mounted on the trough. The shafts carry paddles 21a.

The trough 7 is equipped with wheels 16 which rest on the pan 10 of a scale whose weight responsive elements 20 have been shown in a conventional manner. The scale is arranged to display the weight of the material in the trough 7 on a dial 11. The trough 7 is attached to the frame 1 by a sturdy lifting fork including rigid linkage members 12, 14 which are hingedly connected to the trough 7 by pivot pins 26, to the front end of the frame 1 by pivot pins 27, and to each other. Two hydraulic cylinders 13, 15 are respectively interposed between the frame and the linkage members, and between two sets of linkage members for moving the trough 7 from the fully drawn weighing position about the axis of the pivot pins 27 to a discharge position shown in broken lines in which the open side of the trough faces forward and downward.

A drag line 17 is mounted on the frame 1 for bringing aggregate 18 to the bins 6, and is controlled from an operator's control cabin, not itself shown in the drawing. Discharge of cement from the receptacle 5 is controlled by a valve 22 actuated by a motor 23. The discharged cement drops into a funnel 8 whose bottom is releasably closed by a flap 25 located above the open top of the trough 7. The funnel 8 is a part of a scale whose weight-responsive elements are diagrammatically indicated at 24. The dial 9 indicates the weight of the cement contained in the funnel 8.

The aforedescribed apparatus is operated as follows:

The several types of aggregate are introduced sequentially into the trough 7 from the outlets 4 in amounts controlled according to weight as displayed on the dial 10, and mixing of the material by means of the paddles 21a is started at once. The necessary amount of cement is drawn from the receptacle 5 into the funnel 8 by means of the valve 22, and is weighed separately.

The cement is added to the other ingredients in the trough 7 while mixing continues.

Water is added to the mixture in the trough 7 at the appropriate time from a non-illustrated source in a measured amount, as is well known, and the hydraulic cylinder 15 is actuated to retract its piston so that the trough 7 is moved approximately horizontally forward from its weighing position on the pan 10, and finally is suspended from the fork on the pivot pins 26. The piston then is expelled from the hydraulic cylinder 13 to swing the lifting fork on the pins 27, and thereby to move the trough 7 forward and upward.

A rope 28, not shown in the weighing position of the trough 7, is attached to the trough 7 at a distance forward from the pins 26 and also to the frame 1 of the mixing plant. During the swinging movement of the trough, the rope 28 is tensioned and the trough is tilted into the discharge position.

What is claimed is:
1. A plant for mixing concrete and the like comprising, in combination:
 (a) a support;
 (b) a scale mounted on said support;
 (c) a container having an open side;
 (d) moving means on said support for moving said container in an arcuate path about a substantially horizontal pivot axis between a weighing position and a discharge position upwardly spaced from said weighing position, said moving means including a linkage interposed between said support and said container, said linkage including a plurality of rigid, hingedly connected members, and fluid-pressure operated means for hingedly moving said members relative to each other, and
  (1) said container when in said weighing position being supported on said scale, and said open side thereof facing in an upward direction,
  (2) said open side facing away from said upward direction in said discharge position of the container;

(e) a mixing paddle mounted in said container for rotation about an axis substantially parallel to said pivot axis in said positions of said container and during movement of said container between said positions thereof;
(f) drive means for actuating said rotation of said paddle; and
(g) a plurality of discharge means arranged on said support for discharge of material therefrom into said container when the same is in said weighing position thereof.

2. A plant as set forth in claim 1, further comprising a plurality of wheels on said support for wheeled movement of said plant between a plurality of locations.

3. A plant as set forth in claim 1, wherein said moving means further includes a tension member having respective portions secured to said container and to said frame for guiding said container between said positions thereof.

References Cited by the Examiner
UNITED STATES PATENTS 2,059,857  11/1936  Erickson _____ 259—169
2,815,195  12/1957  Bolt _____ 259—160

FOREIGN PATENTS 1,292,163  3/1962  France.
853,443  11/1960  Great Britain.

WALTER A. SCHEEL, *Primary Examiner.*
CHARLES A. WILLMUTH, *Examiner.*